(12) United States Patent
Lapeyre et al.

(10) Patent No.: US 7,508,815 B2
(45) Date of Patent: Mar. 24, 2009

(54) METHOD AND SYSTEM FOR FACILITATING NETWORK TROUBLESHOOTING

(75) Inventors: Jean Pierre Lapeyre, San Diego, CA (US); Sergey Vladimirovich Kryuchkov, Morrisville, NC (US); Gary A. Meyer, Raleigh, NC (US); Jay Stewart, Raleigh, NC (US)

(73) Assignee: Acterna LLC, Germantown, MD (US)

( * ) Notice: Subject to any disclaimer, the term of this patent is extended or adjusted under 35 U.S.C. 154(b) by 1014 days.

(21) Appl. No.: 10/814,543

(22) Filed: Mar. 31, 2004

(65) Prior Publication Data

US 2005/0226233 A1    Oct. 13, 2005

(51) Int. Cl.
*H04L 12/66* (2006.01)
(52) U.S. Cl. ...................... 370/352; 370/252
(58) Field of Classification Search ......... 370/352–356, 370/250, 252, 442
See application file for complete search history.

(56) References Cited

U.S. PATENT DOCUMENTS 7,197,010 B1*  3/2007  Berstein et al. ............. 370/356
2004/0001501 A1*  1/2004  Delveaux et al. ............ 370/442
2005/0053009 A1*  3/2005  Denby et al. ................ 370/250
2005/0195797 A1   9/2005  Kryuchkov et al. ......... 370/352

* cited by examiner

*Primary Examiner*—Suhan Ni
(74) *Attorney, Agent, or Firm*—Allen, Dyer, Doppelt, Milbrath & Gilchrist, P.A.

(57) ABSTRACT

A computer program product is embodied on a computer readable medium for using voice data traffic to reproduce a user experience for facilitating troubleshooting of at least one of a plurality of VoIP stations. The computer program product includes computer-executable instructions for retrieving packets of the voice data traffic associated with the VoIP station, and identifying time stamps associated with the retrieved packets. An amount of jitter associated with each of the retrieved packets is determined at least partially dependently upon the identified time stamps, and it is determined whether each of the retrieved packets will fit into a jitter buffer at least partially dependently upon the determined amounts of jitter. The instructions include dropping select ones of the retrieved packets dependently upon the determination of whether each of the retrieved packets will fit into the jitter buffer and, filling a buffer with at least select ones of the retrieved data packets not dropped.

27 Claims, 6 Drawing Sheets

METHOD AND SYSTEM FOR FACILITATING NETWORK TROUBLESHOOTING

FIELD OF THE INVENTION

The present invention relates to systems and methods for troubleshooting voice quality problems occurring in voice applications, such as Voice over IP (VOIP) systems, utilizing networks, such as Internet Protocol (IP) networks.

BACKGROUND OF THE INVENTION

As networks, and applications that utilize them, become more and more complex, so do potential problems associated with them. Analogously, as problems become potentially more and more complex, so do troubleshooting and remedying them.

For purposes of completeness, "network" as used herein generally refers to any group of two or more network devices, such as VoIP stations and computers, linked together. Common examples of networks include Local Area Networks, Wide Area Networks, Campus Area Networks, Home Area Networks and the global interconnection of computers, and other computing devices, commonly referred to as the Internet. As used herein, "VoIP station" generally refers to an IP telephone or other network element involved in the transport, creation, or termination of VoIP packets, while "computer" generally means a programmable machine, like a commercially available Personal Computer (PC). Further, by way of non-limiting example also, "application" as used herein generally refers to any program or group of programs designed for end users or for another program. Common examples of applications include database programs, word processors, and spreadsheets.

Internet Protocol (IP) networks use a particular format of packets, also called datagrams, and addressing scheme. IP uses data grams that include headers that provide information related to the data being transmitted. A network that utilizes IP is one example of a packet switched network. Each packet is transmitted individually and can even follow a different route to its destination. Once all the packets forming a message arrive at the destination, they are recompiled into the original message. Packet headers typically specify type of service (ToS), identification values, the allowability of datagram fragmenting, time to live values, protocol identifiers, source and destination addresses and padding, by way of non-limiting example only. This information may be used to route payload data across an IP network from a source IP address to a destination IP address.

The present invention will be described as it relates to VoIP systems and their underlying IP networks for purposes of explanation and by way of non-limiting example only. For purposes of completeness only, VoIP is a category of application that enables people to use packet switched networks as a transmission medium for telephone calls. Of course other applications, such as Fax over IP (FIP) may be suitable for use with the present invention also. Further, other types of networks and protocols may be suitable for use with the present invention as well.

In order to send voice over a packet network, one first digitizes the voice signal, using an Analog-to-Digital (A/D) converter and Pulse-Code Modulation (PCM) for example. By way of non-limiting example, commercially available computer sound cards or VoIP phones may be used to accomplish this digitization. The digitally sampled and quantized voice signal may then be routed across the network using conventional packet switching methodologies, such as those associated with IP. The received signal may then be reconstructed into analog form for listening. This is, in essence, the reverse of digitization, and may also be accomplished using a commercially available computer sound card or VoIP phone, by way of non-limiting example. For return voice communications, the same methodology may be used.

When users of VoIP stations experience problems, such as by experiencing audio distortion, a need exists for a method and system for rapid troubleshooting. For example, VoIP users typically want quality and reliability associated with Private Branch Exchange (PBX) systems. In other words, users typically want very few noticeable errors and low delays, such as with conventional telephone systems like PBX systems. With packetized voice however, each packet will typically arrive with a slightly different amount of delay, resulting in jitter. Jitter is a result of the different packet delays, or variations in packet inter-arrival time. In other words, if two packets are sent and received across a network, the difference in delay between the transmissions and receptions is jitter.

RTP timestamps and jitter buffers may be used to counter the deleterious effects of jitter. For purposes of completeness, "RTP" stands for Real Time Protocol, which is carried in a User Data gram Protocol (UDP). This protocol may be used to carry voice and video real-time media information in a VoIP system. A jitter buffer may be used to smooth out delay variability, in order to conceal jitter from end users. The timestamps may be used to determine what level of jitter exists, while the buffer serves to re-coordinate delivery of the packets and remove jitter.

Also, due to the nature of packet networks in general, some packets will inevitably include errors on arrival or not even arrive at all. While these circumstances are foreign to conventional PBX systems, packet loss is common in data networks, in general. This may also represent a significant problem with VoIP applications, where the occurrence of such losses of data may not be well tolerated.

It is believed that a technician attempting to duplicate the problematic VoIP behavior using a simple voice-file playback tool may fail to reliably reproduce the behavior or failure being complained of. In fact, it is believed that a technician attempting to remedy a problem reported with a VoIP system may wholly misdiagnose or fail to appreciate the actual problem being complained of, instead wasting valuable time performing otherwise unnecessary services.

It is thus desirable to provide a system and method for more rapidly troubleshooting networks and applications that use them, such as IP networks and VoIP systems, by providing a reliable method for reproducing a customer's experience, such as with a particular telephone call for example.

SUMMARY OF THE INVENTION

A computer program product being embodied on a computer readable medium for using voice data traffic to reproduce a user experience for facilitating troubleshooting at least one of a plurality of VoIP stations, the computer program product including computer-executable instructions for: retrieving packets of the voice data traffic associated with the at least one of the VoIP stations; identifying time stamps associated with the retrieved packets; determining an amount of jitter associated with each of the retrieved packets at least partially dependently upon the identified time stamps; determining whether each of the retrieved packets will fit into a jitter buffer at least partially dependently upon the determined amounts of jitter; dropping select ones of the retrieved packets dependently upon the determining whether each of the retrieved packets will fit into the jitter buffer; and, filling a buffer with at least select ones of the retrieved data packets not dropped.

BRIEF DESCRIPTION OF THE FIGURES

Understanding of the present invention will be facilitated by consideration of the following detailed description of the preferred embodiments of the present invention taken in conjunction with the accompanying drawings, in which like numerals refer to like parts and.

DETAILED DESCRIPTION OF THE PREFERRED EMBODIMENTS

It is to be understood that the figures and descriptions of the present invention have been simplified to illustrate elements that are relevant for a clear understanding of the present invention, while eliminating, for purposes of clarity, many other elements found in typical networks and testing systems. Those of ordinary skill in the art will recognize that other elements may be desirable in implementing the present invention. However, because such elements are well known in the art, and because they do not facilitate a better understanding of the present invention, a discussion of such elements is not provided herein. The disclosure herein is directed to all such variations and modifications known to those skilled in the art.

According to an aspect of the present invention, a system and method for reliably reproducing a customer's experience with a VoIP system may be provided. The system and method may serve to provide a visual representation of jitter and packet loss. According to an aspect of the present invention, the system and method may emulate an end-user VoIP station associated with a troublesome communication to more reliably recreate the user's experience. The system and method may serve to emulate the jitter buffer performance of such a VoIP station. According to an aspect of the present invention, comfort noise, as is conventionally understood by those possessing an ordinary skill in the pertinent arts, may be provided to more accurately recreate the user's experience. Finally, according to an aspect of the present invention, playback of troublesome VoIP calls may be provided in stereo, such that one party may be heard from one audio channel, such as a left channel, while another party may be heard from another audio channel, such as a right channel.

Figure 1:
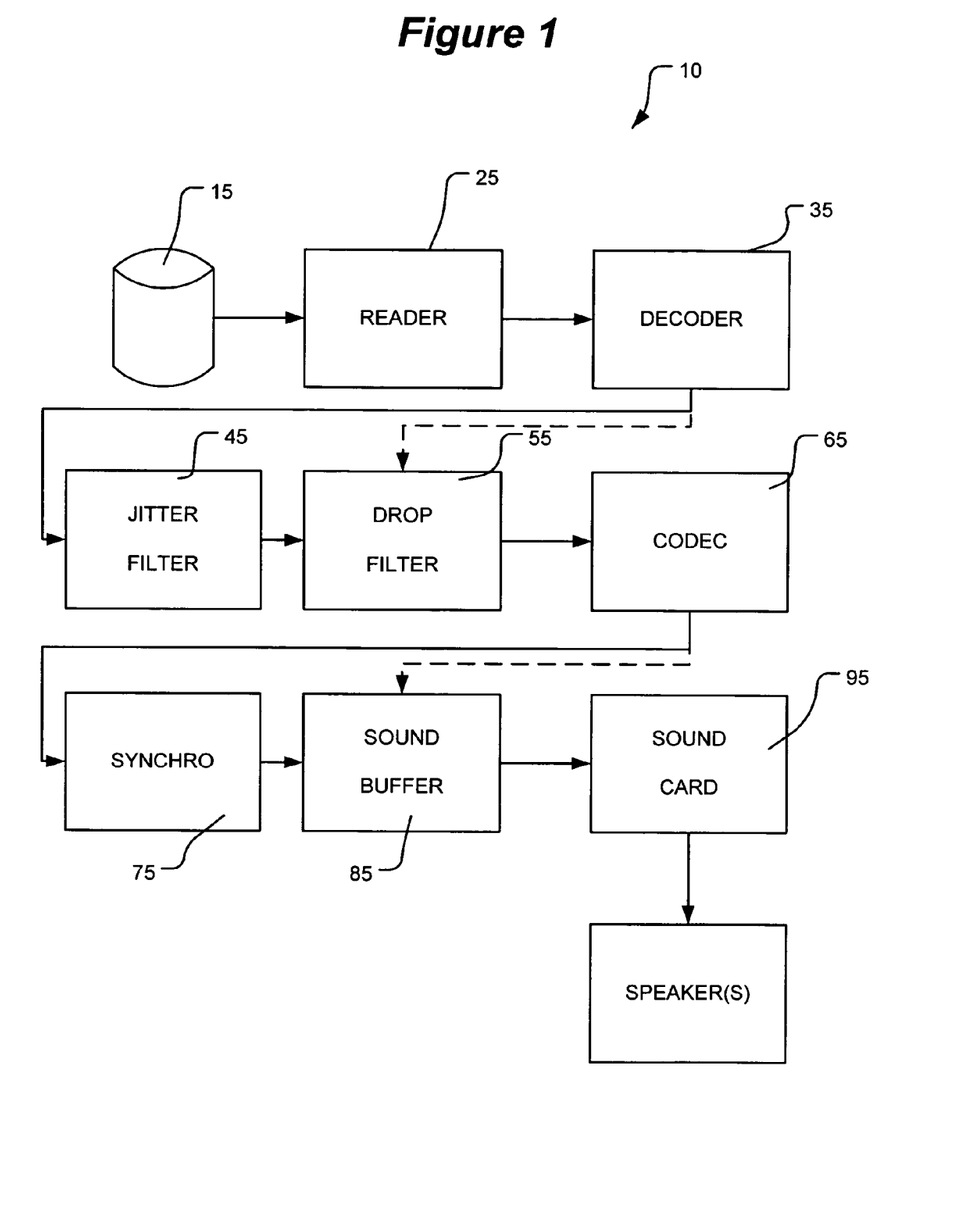
FIG. 1 illustrates a block diagrammatic view of a system according to an aspect of the present invention.

Referring now to FIG. 1, there is shown a block diagrammatic representation of a system 10 according to an aspect of the present invention. System 10 generally reads source data associated with a customer complained about communication from a data source 15. The data may be accessed by a reader 25, in-turn feeding a decoder 35, jitter filter 45, drop filter 55, codec 65, synchronizer 75, sound buffer 85 and sound card 95. Resulting data may be stored in a WAV file using conventional methodologies, for example. Voice samples may be provided by buffer 85 to sound card 95. Sound card 95 may take the form of hardware and/or software suitable for reading the samples from sound buffer 85 and converting them into analog signals sent to reproduction devices, such as one or more speakers. System 10 may be provided using one or more computers and a combination of hardware and/or software.

Data associated with and indicative of a problematic telephone call may be provided to source 15 in any suitable manner. One such manner is disclosed in commonly assigned and copending U.S. patent application Ser. No. 10/793,358, entitled SYSTEM AND METHOD FOR FACILITATING NETWORK TROUBLESHOOTING, filed Mar. 4, 2004, under Express Mail No. EV342399613US, the entire disclosure of which is hereby incorporated by reference as if being set forth in its entirety herein.

Referring again to FIG. 1, source 15 may take the form of any kind of media suitable for delivering network frames. Source 15 may be a disk file that contains network frames in the form of a capture file, or a network itself. Where source 15 is a disk file, it may be categorized as an "off-line play-back" source. Where source 15 takes the form of a network itself, it may be categorized as a "real-time play-out" source.

Packet reader 25 may use an interface provided by packet source 15 to obtain the packets and forward them to the rest of the system 10. Packet reader 15 may serve to isolate the rest of system 10 from differences in packet source 15 interfaces. Reader 25 may retrieve data associated with and indicative of a problematic call from source 15. Reader 25 may take the form of conventional systems and methods associated with operating systems for accessing data. While the present invention is discussed as it related to the Microsoft Windows operating system, generally any suitable operating system may be used, such as Windows 98, ME, 2000, XP Pro/Home. Other suitable operating systems may also be used, such as LINUX or Mac OS, all by way of non-limiting example only.

Reader 25 may provide data read to decoder 35. Decoder 35 may serve to decode packets provided by reader 25. When decoder 35 detects a data protocol packet, such as an RTP protocol packet, associated with a current call or other call being played or investigated, it may forward that packet to jitter filter 45 for further processing. Otherwise, the packet may be disregarded by decoder 35. The present invention will be further discussed with nonlimiting specific reference to RTP packets for purposes of clarity only, it being understood the present invention is well suited for use with other protocols as well.

Decoder 35 may take the form of code suitable for identifying RTP protocol packets, VoIP stations associated with such RTP packets, and executing logic for determining whether the identified packet should be further processed. Packets selected for further processing may be forwarded to jitter filter 45.

Jitter filter 45 may serve to emulate jitter buffer logic associated with VoIP station hardware and make decisions whether the packet should be dropped (because the packet does not fit into the emulated jitter buffer, for example) or be processed. In the latter case, the packet may be forwarded to drop filter 55. According to an aspect of the present invention, a user can set the jitter buffer size to 0. This may serve to disable the jitter filter 45 such that each packet will be forwarded to drop filter 55. This is graphically illustrated by the dotted line between decoder 35 and drop filter 55 in FIG. 1. In another words, when the jitter buffer is set to 0, this essentially allows operation to bypass jitter filter 45 testing.

According to an aspect of the present invention, jitter filter 45 may take the form of a buffer module having a well-defined polymorphic interface, such that the module may be customized to allow third parties to develop their own jitter buffer module and test how the specific implementation of the jitter buffer affects or improves the voice quality. As will be recognized by those possessing an ordinary skill in the pertinent arts, such an architectural solution makes a system according to an aspect of the present invention useful for hardware/software engineers who are responsible for designing and implementing the jitter buffer for VoIP stations in a broad sense, such as in connection with VoIP phones, VoIP gateways and Call Managers by way of non-limiting example only.

The following illustrates a non-limiting exemplary method for operating jitter buffer 45. In a one-directional RTP stream, each RTP packet may have three associated numbers. The first, t, is the packet time-stamp or actual time when the packet is picked up from the wire. This may be measured in milliseconds. The second is $\tau$, the RTP time-stamp stored in the RTP header. This defines the position of the voice in the sound buffer, and is typically measured in samples assuming a constant sampling rate (such as 8000 samples per seconds). It may conventionally be assumed this is converted into milliseconds. The third is $\sigma$, which is the size of the RTP payload of the packet. This is usually constant for all streams and measured in bytes.

One may enumerate all packets of a one-directional stream with index i=0, 1, 2. . . . So in general, we have three sequences: $t_i, \tau_i, \sigma_i = \sigma$; i=0, 1, 2, . . . .

Figure 2:
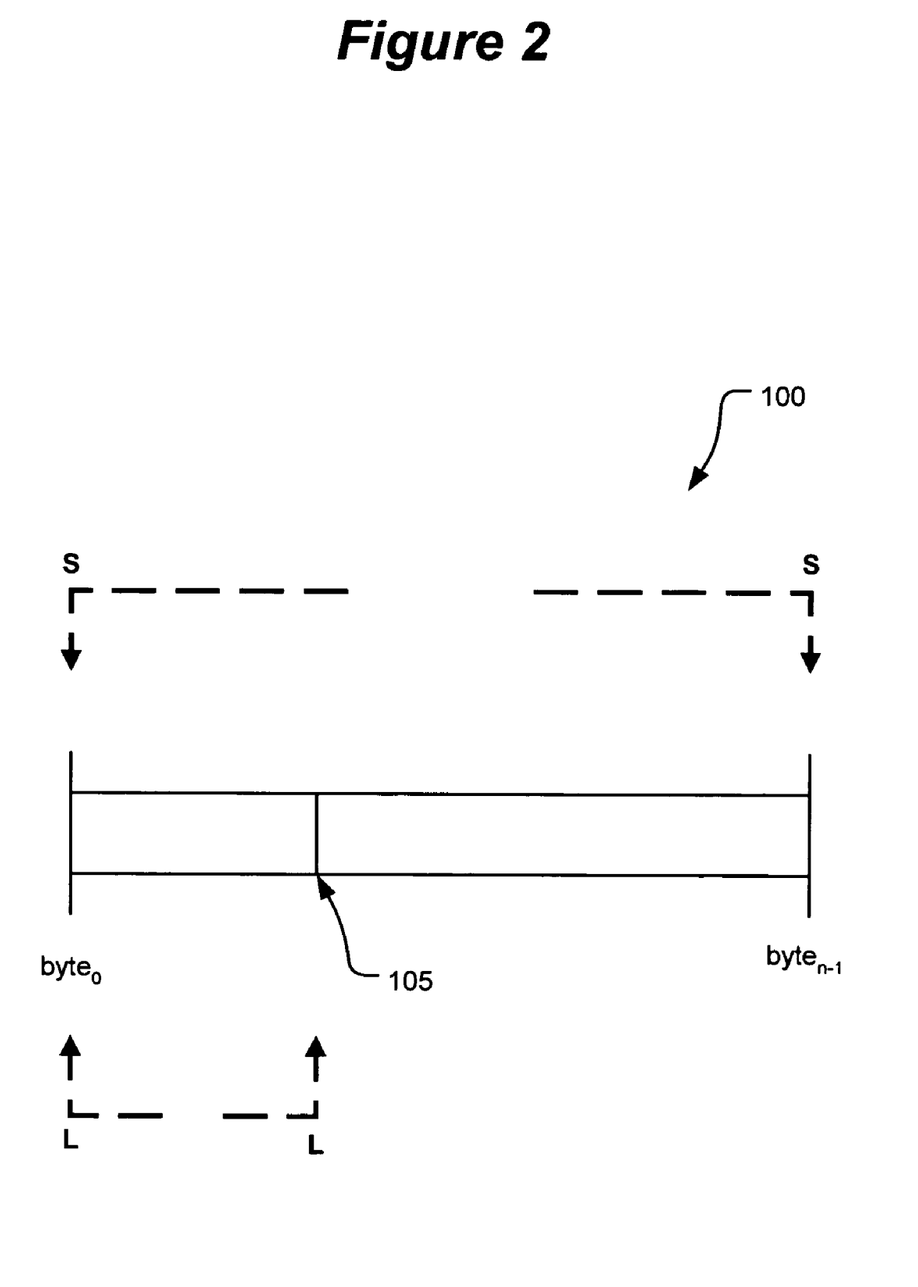
FIG. 2 illustrates a diagrammatic view of a buffer that may be used according to an aspect of the present invention.

Referring now also to FIG. 2, there is shown a diagrammatic representation of a buffer 100 according to an aspect of the present invention. Two additional parameters characterizing the jitter buffer are S, or the total size of jitter buffer in bytes, and L, the size of the portion of the jitter buffer for late packets in bytes. FIG. 2 illustrates a graphical representation of the jitter buffer in an initial state, such as just after buffer reset. The initial position of the write pointer where the first packet is to be placed is designated 105.

A playback rate r, which is measured in bytes per millisecond, may be determined. If the voice sampling rate is 8000 samples per second and each sample is 16 bits long (2 bytes), then one may have 8 samples per millisecond and the r=8·2=16(bytes/ms). The playback rate r may be codec dependent. For instance, G.711 delivers one sample per byte. That means that for the G.711 codec, the playback rate $r_{G.711}$=8·1=8(bytes/ms). For G.729, 10 bytes deliver 80 samples. So, we have an average of 8 samples per byte (or ⅛ byte per sample), and $r_{G.729}$=⅛=1(bytes/ms).

A sample density d that defines the size of the sample in bytes in the RTP payload may be measured in bytes per sample. Further, a sampling rate R may define the number of samples per millisecond. Accordingly, the rate may be written as: r=R(samples/ms)·d(bytes/sample)=(R·d)bytes/ms It may be assumed that the jitter buffer stores RTP payloads only. To understand an algorithm that simulates the behavior of the jitter buffer in real-time, the values for S and L may be considered fixed.

Assuming the jitter buffer has been reset and a first packet has been received, the jitter buffer may place the packet at the current write position, $p_0$=L, and start a voice generation module that reads data from the beginning of the jitter buffer. The state of the buffer at this time may be defined by the following set of parameters. Times $t_0, \tau_0$, and size $\sigma$ may be remembered. The read (or playout) position is set to the beginning of the jitter buffer: $g_0$=0.

A next packet received may be characterized as having $t_1$, $\tau_1$ parameters and may be assumed to be of the same size $\sigma$. At the moment of the packet arrival $t_1$, the playback position in the jitter buffer is $g_1$=r($t_1$-$t_0$). The new packet can be placed everywhere from $g_1$ to $g_1$+S. The RTP time-stamp $\tau_1$ defines the position of the packet in the sound buffer. The difference $\tau_1$-$\tau_0$ gives the number of samples between the two packets. It means that the (relative) location of the voice packet (in bytes) is $p_1$=($\tau_1$-$\tau_0$)·d+L. The jitter buffer has to copy the frame into interval $I_1$=[$p_1$, $p_1$+$\sigma$). This is possible where this interval is the subinterval of the free space of the jitter buffer. These areas are I=[$g_1$, $g_1$+S). This assumes that the jitter buffer is allowed to reuse the space occupied by the data that was already played out. So, if the following relation is true, the packet is accepted by the jitter buffer (positive decision) ($g_1 \leq p_1$)∩($p_1$+$\sigma$<$g_1$+S). Otherwise the decision is negative and the packet may be dropped.

For each subsequent packet, the following formula for making a decision for the $i^{th}$ packet may be utilized:

$$g_i = r(t_i - t_0)$$

$$p_i = d(\tau_i - \tau_0) + L$$

$$P = (g_i \leq p_i) \cap (p_i + \sigma \leq g_i + S)$$

If P is true, the decision is positive. Otherwise it's negative and the packet may be dropped.

Referring again to FIG. 1, output from jitter filter 45 or decoder 35 may be provided to drop filter 35. According to an aspect of the present invention, a user may configure a percentage of packets subjected to an introduced packet drop. This allows users to emulate packet loss and check a corresponding impact on realized voice quality. User configuration of the percentage of introduced packet drop may change the configured parameters of drop filter 55. Drop filter 55 may use a random number generator to decide whether to drop or to pass any given packet received. The distribution of the random variable can be selected from a set of well-known distributions, such as a uniform distribution by nonlimiting example only. Where a uniform distribution is used all packets have an equal chance, defined by the percentage specified by the user, to be dropped. Other algorithms to drop packets could be used, such as dropping several sequential packets (burst of packet loss).

According to an aspect of the present invention, the jitter filter 45 and drop filter 55 may be realized as separate or common filters. Either, or both, of the filters may take the form of code suitable for executing logic for emulating the desired drop characteristics. Such as, in the case of drop filter 55, to force emulated packet loss into the reproduction, such as 5% or 10%, by way of non-limiting example only.

The compressed voice packets that have not been filtered out may be provided to CODEC 50 for de-compression. CODEC 65 may decode the RTP payload of received packets and generate PCM packets. These packets may typically contains the 16-bit voice samples (in PCM representation), and the RTP timestamp in a conventional manner. The decompressed voice data and time stamps may be provided to synchronizer 75.

Synchronizer 75 may take the form of code suitable for synchronizing the speed of the incoming PCM packets with the playing speed of the voice samples by the Sound Card's 95 Digital Signal Processor (DSP). Synchronization may be needed where these speeds can be different. For example, when off-line playback is effected, the speed of reading packets from source 15 may be greater than the playback speed. If the speeds are the same (as in the case of real-time play-out, for example) the synchronization may not be needed and can be bypassed as shown by a dotted line between CODEC 65 and buffer 85 in FIG. 1. Output data is provided to sound buffer 85.

In other words, because Synchronizer 75 is between two streams with different speeds, where the incoming stream may be faster than the outgoing one, this is an alternative to the Producer/Consumer design. For purposes of completeness, the standard Producer/Consumer design assumes the producer is waiting when the buffer is full and the consumer is waiting when the buffer is empty. In the present scenario, the consumer may be thought of as sound card 95 that plays the voice out of sound buffer 85 with a fixed speed and does not wait. If the voice was not put into the sound buffer on time, sound card 95 may play out whatever was left in the sound buffer 85.

Because a system according to the present invention may run on non-real time Operating Systems like Windows 2000, Windows XP, and Windows 98, synchronizer 75 may not typically rely on timers provided by this kind of Operating System, due to their imprecise nature and heavy dependency on the system load at a given time, i.e., on the number and type of applications running in parallel.

It may be possible to consume all CPU time available by implementing the synchronization through constantly checking of system time (like a multimedia timer or performance counter). Such synchronization may lead to a sluggish application that slows down the whole computing platform, i.e., PC without performing very much.

Figure 3:
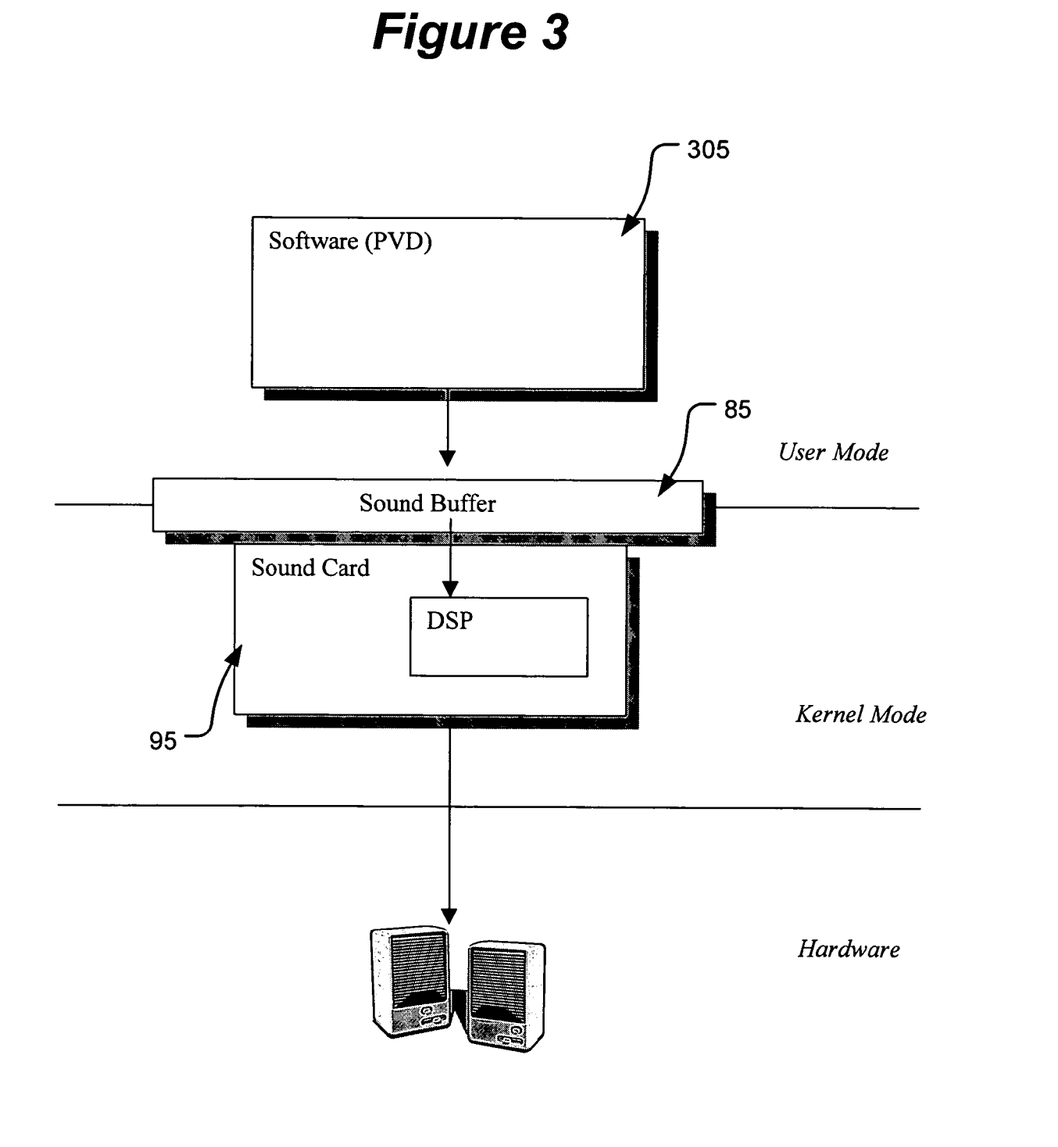
FIG. 3 illustrates the position of a sound buffer in a protected operating system according to an aspect of the present invention.

According to an aspect of the present invention, such an undesirable result may be avoided as follows. FIG. 3 illustrates a position of sound buffer 85 in a protected Operating system, like Solaris or Windows according to an aspect of the present invention. Sound buffer 85 may be thought of as a piece of memory that is located between application software 305 that provides the sound samples for playout and hardware (such as a DSP of sound card 95) that reads these samples and converts them into an analog representation. This illustrates a software producer and hardware consumer.

Sound buffer 85 is shown on the boundary between User and Kernel modes, because sound buffer 85 can be allocated in User Mode memory or directly in memory that resides on the board of sound card 95 (Kernel mode), for example. The DSP of sound card 95 may work like a classical consumer, i.e., when the DSP needs the next set of sampled sound, it generates a hardware interrupt notifying the rest of the system. This interrupt can be delivered to the software using standard procedures specific to a given operating system. The operating system translates the interrupt into some sort of notification for the application running in User Mode. These notifications are called position notifications. According to an aspect of the present invention, position notifications may be used to control the speed sound or voice data is copied into sound buffer 85 to provide synchronization.

Figure 4A:
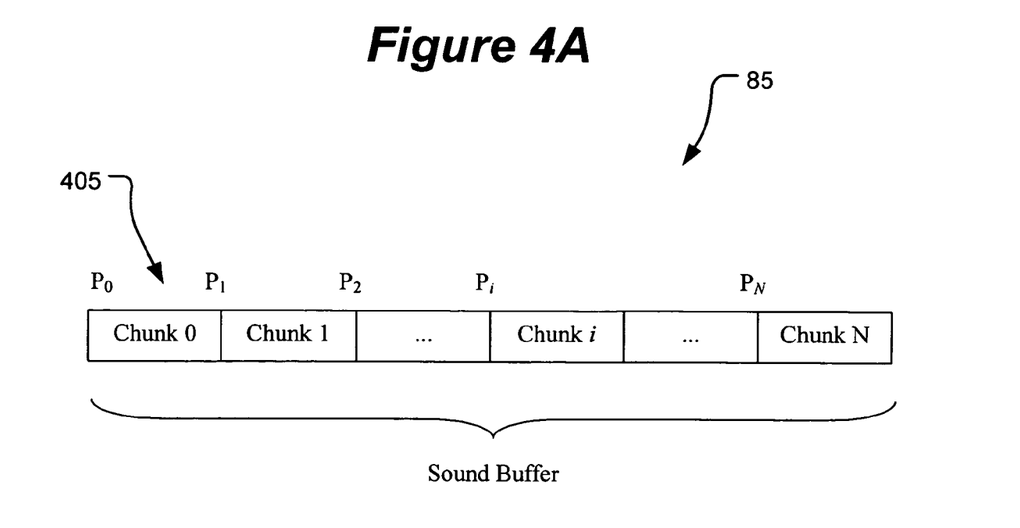
FIGS. 4A-4C illustrate diagrammatic representations of usage of a sound buffer according to an aspect of the present invention.
Figure 4B:
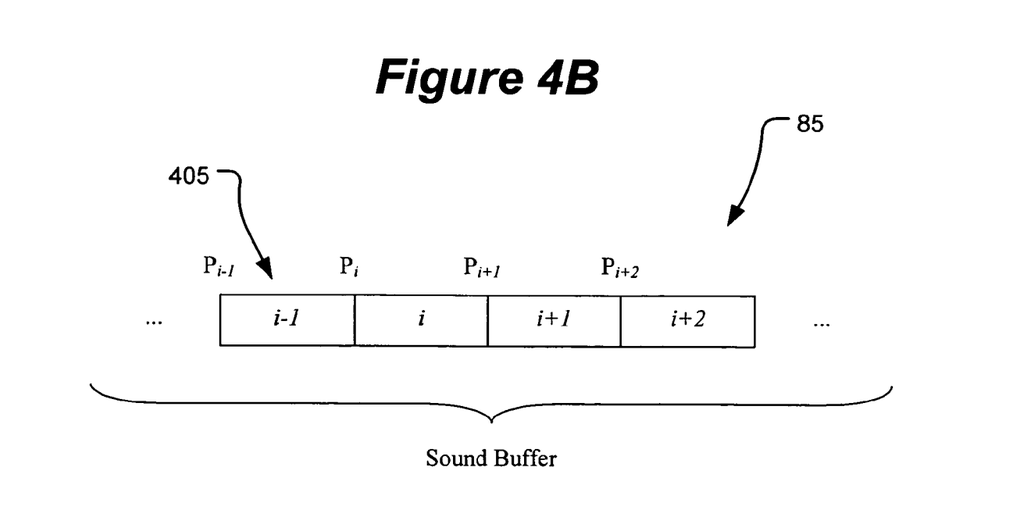
Figure 4C:
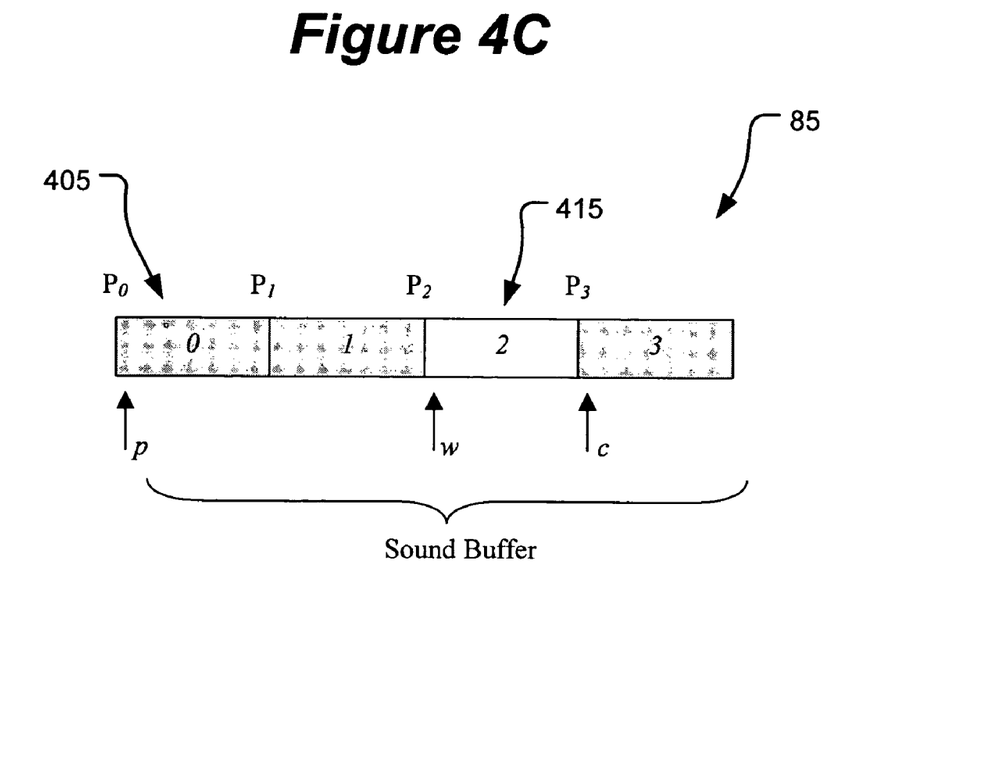

Synchronizer 75 may take the form of code suitable for implementing layer for filling buffer 85 in a manner that provides synchronization. Referring now also to FIGS. 4A-4C, sound buffer 85 may be logically divided into some number of chunks 405, each of a fixed size. Each chunk has a number (counting from 0).

For non-limiting purposes of completeness, a "buffer" is generally any temporary storage area. A buffer may virtually exist in memory, such as RAM. Sound buffer 85 may take the form of a memory buffer where voice samples are placed for play-out. Sound buffer 85 may take the form of a queue in a producer-consumer paradigm with a non-waiting consumer.

At the beginning of each chunk, a position notification point may be set. This means that when the DSP asks for the portion of the sound that contains the point at the beginning of the chunk, the operating system will generate an event (position notification). So, the position notification is generated at points $P_0, P_1, \ldots P_N$.

For purposes of completeness, buffer 85 may be divided in this manner because although sound card 95 and its DSP use a precise hardware clock, we may not know how many sound samples will be asked for by the DSP in advance of the request. This means that the position notification does not happen exactly at the time when the DSP crosses the beginning point of the chunk. The operating system has to catch this notification and deliver it to the application running in the User Mode across the User/Kernel border. This delivery takes a short but unpredictable amount of time when dealing with non-real-time operating systems. Effectively, position notifications are received by the application at an approximate time. Utilization of memory chunks may serve to ameliorate this issue.

Referring now also to FIG. 4B, there is shown a diagrammatic representation of a piece of sound buffer 85 somewhere in the middle. Each chunk can be in one of two states: "open" and "closed". When a position notification for point $P_i$ is received, the DSP has crossed this point. The handler of this notification may close chunks i−1, i, and i+1 and open all others. The application may be allowed to write data into the chunk if the chunk is in the "open" state. If the application needs to write data into a chunk that is closed it has to wait until the chunk changes state from "closed" to "open". The chunk is in the "closed" state if the DSP could use at least a small portion of the chunk for Digital-to-Analog conversion. The size of the chunk may be selected to be large enough to protect from the imperfection of the position notification. The state of the chunk may be implemented as an event (for Microsoft Windows) or conditional variable (for POSIX compliant UNIX). If an event (conditional) is in the signaling state, the chunk is in the "open" state. Otherwise it's in the "closed" state.

According to an aspect of the present invention, four chunks may be used. Each chunk may be one second long. This accommodate the situation where the position notification happens up to half a second later or sooner than expected. As will be recognized by those possessing an ordinary skill in the pertinent arts, other chunk sizes and number may be used. For example, the size of the chunk can be much smaller, however chunk size may be selected in relation to the estimated performance of the system.

Referring now also to FIG. 4C, an initial state (just at the beginning of the playout) of sound buffer 85 divided into 4 chunks looks is illustrated therein.

Chunk 415 is open. All others are closed. p denotes the play position used by the DSP to generate the analog signal. w stands for write position. The application writes at this position. c is a clean pointer. Where the packet source is a disk file, the stream of samples into sound buffer 85 may be faster than the speed of consumption by the DSP of sound card 95. This results in the application to fill Chunk 415 very quickly.

Figure 5:
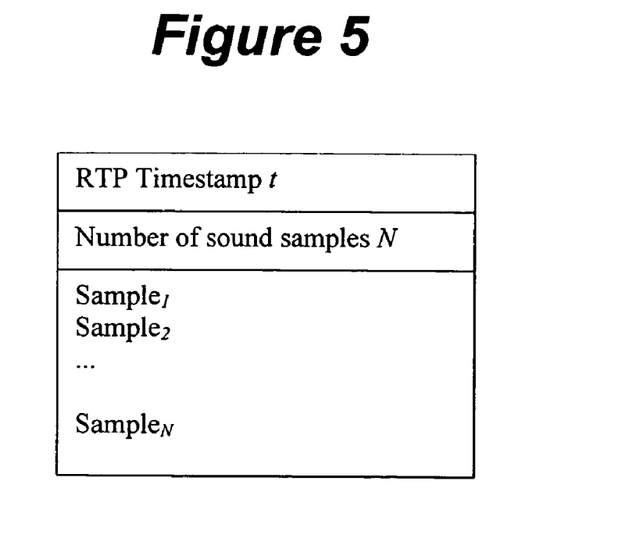
FIG. 5 Illustrates a synchronizer input according to an aspect of the present invention; and, FIG. 6 illustrates a buffer cleaning logic that may be used according to an aspect of the present invention.

The input of synchronizer 75 in this case is shown in FIG. 5. The synchronizer calculates the chunk number where the sound has to be placed by using $i=4(t-t_0)/s$, where i is the chunk index, $\tau_0$ is the RTP timestamp of the very first piece of the sound, and s is the chunk size. If the chunk with the calculated index is closed, the synchronizer waits for the event that signals that the chunk is open. The event awakes synchronizer 75, which then writes the sound into the sound buffer 85.

According to an aspect of the present invention, sound buffer 85 may take the form of a circular buffer. A clean-pointer functionality may be used to account for the circular nature of sound buffer 85. For non-limiting purposes of clarity, one may assume we have a continuous stream of sound for a time big enough to fill the whole sound buffer. The DSP plays this sound and then wraps around the end of the buffer and starts playing from the beginning. Because we are dealing with network packets (no matter whether we read them from the network directly or from the disk file), packet loss or jitter severe enough to cause a VoIP station jitter buffer to drop packets may exist. In this case, a hole (or gap) in the stream of sound may exist. The part of the sound buffer that would contain this missing packet may not be updated and thus contain the sound that was put in this location during a previous playout. When the play position reaches this location after play position wrap, the previously stored sound will be played again. Because this previous sound is not part of the current sound stream, it will generate artificial sound distortion that may not otherwise be present in the recording. Using a clean pointer functionality ameliorates this risk.

A clean pointer may stay at the beginning of a chunk (clean-chunk) preceding the chunk currently containing the DSP play position. When a notification event happens, cleaning logic may be employed to replace the context of the sound buffer in the clean-chunk with white noise, of a level selected by a user, for example.

Figure 6:
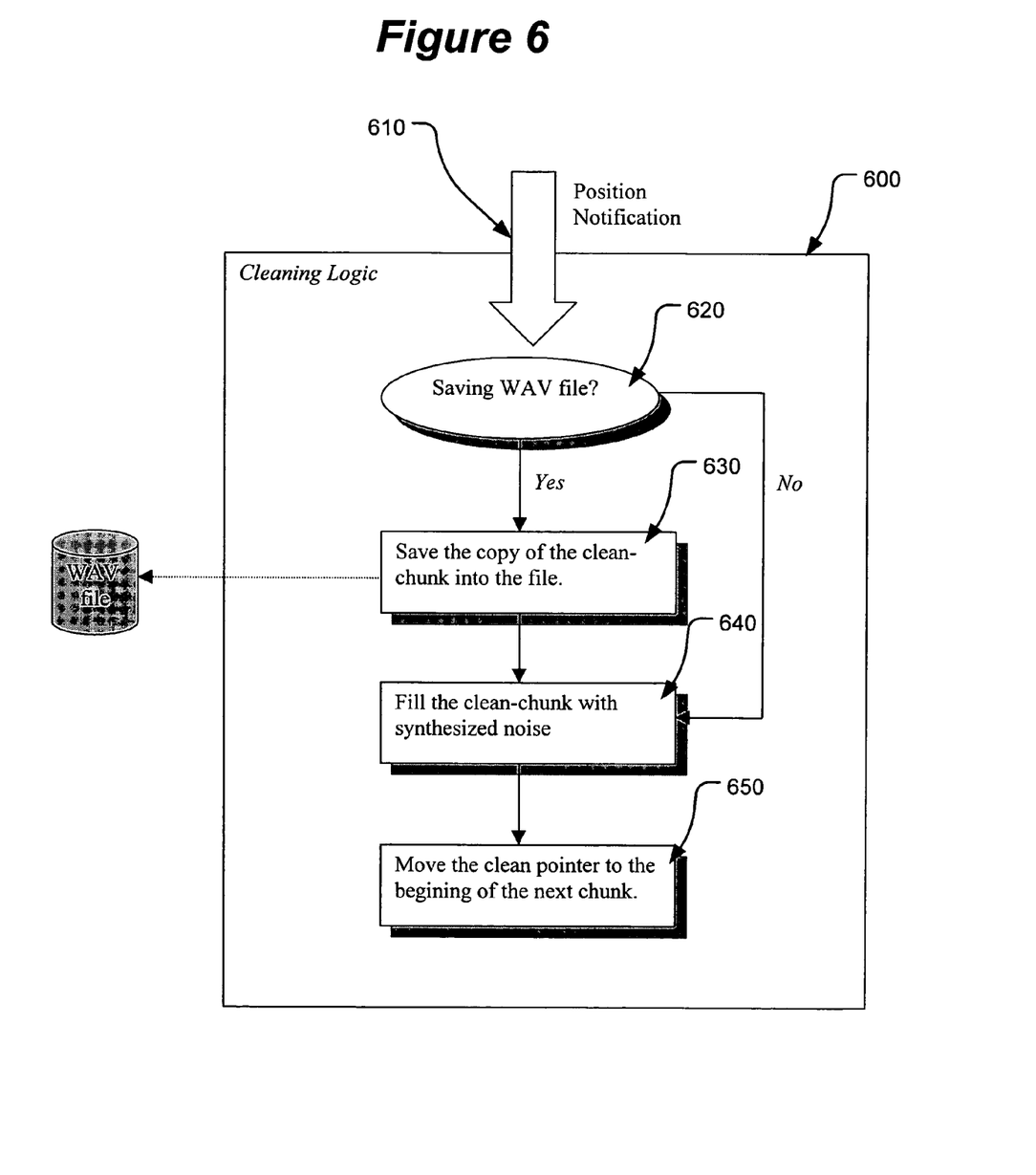

If the user generates a WAV file, the cleaning logic may additionally copy the content of buffer 85 into the file before filling the clean-chunk with white noise. FIG. 6 illustrates a diagrammatic representation of cleaning logic 600 suitable for use with a system according to an aspect of the present invention. Generally, logic 600 receives a position notification 610 as a triggering event. Whether or not a user is generating a WAV file is determined 620. If so, logic 600 may save 630 a copy of the chunk to be cleaned to the target WAV file. The chunk may then be filled 640 with data indicative of white noise. If no WAV file is being generated, logic 600 may proceed from step 620 directly to step 640. Thereafter, the clean pointer may be moved 650 to the next chunk.

According to an aspect of the present invention, a graphical display indicative of detected jitter and packets dropped by jitter filter 60 may be provided.

According to an aspect of the present invention, decoder 35 may identify which party is the source of particular portions of a call by comparing signaling data, such as SCCP data, associated with decoded voice communications. If this data is available it may be used to provide left and right channel separation dependently upon source IP address of voice packets, for example. This channel separation may then be used during playback to provide one party on one channel and the other party on the other channel. This may serve to further facilitate troubleshooting by a technician.

If signaling data are not available, channel separation may be provided based on source and destination IP addresses and ports. It will be apparent to those skilled in the art that modifications and variations may be made in the apparatus and process of the present invention without departing from the spirit or scope of the invention. Thus, it is intended that the present invention cover the modification and variations of this invention provided they come within the scope of the appended claims and their equivalents.

What is claimed is:

1. A computer program product being embodied on a computer readable hardware structure for using voice data traffic to reproduce a user experience for facilitating troubleshooting at least one of a plurality of VoIP stations, said computer program product comprising computer-executable instructions for:
retrieving packets of said voice data traffic associated with the at least one of the VoIP stations;
identifying time stamps associated with said retrieved packets;
determining an amount of jitter associated with each of said retrieved packets at least partially dependently upon said identified time stamps;
determining whether each of said retrieved packets will fit into a jitter buffer at least partially dependently upon said determined amounts of jitter;
dropping select ones of said retrieved packets dependently upon said determining whether each of said retrieved packets will fit into said jitter buffer; and,
filling a buffer with at least select ones of said retrieved data packets not dropped.

2. The product of claim 1, further comprising computer-executable instructions for reading data from said butter to play back audio in a manner representative of a VoIP conversation associated with the at least one of the VoIP stations.

3. The product of claim 1, wherein said identifying time stamps associated with said retrieved packets comprises decoding at least one time stamp indicative of an actual time a corresponding one of said packets was received.

4. The product of claim 3, wherein said identifying time stamps associated with said retrieved packets comprises decoding at least one time stamp indicative of when a corresponding one of said packets was coded.

5. The product of claim 4, wherein said determining an amount of jitter comprises comparing corresponding ones of said time stamps indicative of actual times corresponding to when ones of said packets were received and time stamps indicative of when corresponding ones of said packets were coded.

6. The product of claim 1, wherein said identifying time stamps associated with said retrieved data packets comprises decoding time stamps indicative of actual times each of said packets was received.

7. The product of claim 1, further comprising selectively filling said buffer with data indicative of comfort noise.

8. The product of claim 1, wherein said jitter buffer is user configurable.

9. The product of claim 8, wherein said jitter buffer is associated with the at least one of a plurality of VoIP stations.

10. The product of claim 1, further comprising computer-executable instructions for placing said select ones of said packets into a sound buffer to playback audio indicative of the communications problems.

11. The product of claim 2, further comprising computer-executable instructions for identifying IP addresses associated with said retrieved packets.

12. The product of claim 11, further comprising computer-executable instructions for playing said audio back using separate channels dependently upon said identified IP addresses.

13. The product of claim 12, wherein said each of said channels is associated with a conversation direction.

14. The product of claim 1, wherein said buffer is a circular buffer.

15. The product of claim 1, further comprising computer-executable instructions for generating an audio file dependently upon said buffer.

16. The product of claim 15, wherein said audio file is a WAV sound file.

17. The product of claim 1, further comprising computer-executable instructions for pseudo-randomly selecting ones of said packets to drop.

18. A method for using voice traffic to reproduce a user experience for facilitating troubleshooting problems with at least one VoIP communication, said method comprising:

identifying at least one jitter buffer characteristic associated with the at least one VoIP communication;

accessing data packets of said VoIP traffic associated with the at least one VoIP communication; identifying time stamps associated with said accessed data packets; and, dropping select ones of said accessed data packets dependently upon said identified at least one characteristic and identified time stamps.

19. The method of claim 18, further comprising playing back audio in a manner representative of the user experience using at least some of said accessed data packets not dropped.

20. The method of claim 19, further comprising storing at least some of said accessed packets not dropped.

21. The method of claim 19, wherein said identifying time stamps associated with the received data packets comprises decoding at least one time stamp indicative of an actual time a corresponding one of said packets was received.

22. The method of claim 21, wherein said identifying time stamps associated with the received data packets comprises decoding at least one time stamp indicative of when a corresponding one of said packets was coded.

23. The method of claim 22, wherein said dropping select ones of said packets comprises comparing corresponding ones of said time stamps indicative of actual times of when ones of said packets were received and time stamps indicative of when said packets were coded.

24. The method of claim 19, further comprising storing at least some of said accessed packets not dropped in a buffer and selectively filling said buffer with data indicative of comfort noise.

25. The method of claim 18, wherein said at least one characteristic is associated with a jitter buffer size.

26. The method of claim 18, wherein said jitter buffer size is user configurable.

27. The method of claim 18, wherein said characteristic is user configurable.

* * * * *

UNITED STATES PATENT AND TRADEMARK OFFICE
CERTIFICATE OF CORRECTION

PATENT NO. : 7,508,815 B2  Page 1 of 1
APPLICATION NO. : 10/814543
DATED : March 24, 2009
INVENTOR(S) : Lapeyre et al.

It is certified that error appears in the above-identified patent and that said Letters Patent is hereby corrected as shown below:

Col. 10, line 20, claim 2 "butter" should read -- buffer --

Signed and Sealed this

Twenty-fourth Day of November, 2009

David J. Kappos
*Director of the United States Patent and Trademark Office*